(12) United States Patent
Kitamura et al.

(10) Patent No.: US 7,119,668 B2
(45) Date of Patent: Oct. 10, 2006

(54) ILLUMINATION-CONTROLLED BICYCLE DEVICES

(75) Inventors: Satoshi Kitamura, Kitakatsuragi-gun (JP); Kouji Uno, Osaka (JP); Kazuhiro Fujii, Kawachinagano (JP)

(73) Assignee: Shimano, Inc., Sakai (JP)

( * ) Notice: Subject to any disclaimer, the term of this patent is extended or adjusted under 35 U.S.C. 154(b) by 0 days.

(21) Appl. No.: 10/616,175

(22) Filed: Jul. 7, 2003

(65) Prior Publication Data

US 2004/0036585 A1    Feb. 26, 2004

(30) Foreign Application Priority Data

Jul. 10, 2002    (JP)    ............................. 2002-201122

(51) Int. Cl.
*B62J 3/00* (2006.01)
(52) U.S. Cl. ...................... 340/432; 340/469; 362/473; 345/102
(58) Field of Classification Search ................ 340/432, 340/469; 180/205, 220, 65.6; 345/102; 362/473–475
See application file for complete search history.

(56) References Cited

U.S. PATENT DOCUMENTS

| | | | |
|---|---|---|---|
| 6,109,770 A | | 8/2000 | Choimet et al. |
| 6,144,359 A | * | 11/2000 | Grave .......................... 345/102 |
| 6,204,752 B1 | * | 3/2001 | Kishimoto ................... 340/432 |
| 6,296,072 B1 | * | 10/2001 | Turner ......................... 180/220 |
| 6,529,212 B1 | * | 3/2003 | Miller et al. ................. 345/690 |
| 6,563,479 B1 | * | 5/2003 | Weindorf et al. ............. 345/77 |
| 6,736,759 B1 | * | 5/2004 | Stubbs et al. ................... 482/8 |

FOREIGN PATENT DOCUMENTS

| | | |
|---|---|---|
| EP | 0641711 A1 | 3/1993 |
| EP | 1103454 A2 | 5/2001 |
| EP | 1270397 A2 | 1/2003 |
| EP | 1281611 A2 | 2/2003 |
| JP | 59-160639 | 9/1984 |
| JP | 5-170154 | 7/1993 |
| JP | 06217338 A * | 8/1994 |
| WO | WO 97/03432 A1 | 1/1997 |

OTHER PUBLICATIONS

Patent Abstracts of Japan, vol. 017, No. 248, May 18, 1993 for JP 04-368290 A, published Dec. 21, 1992.
Patent Abstracts of Japan, vol. 2002, No. 2, Apr. 2, 2002, for JP 2001-294185 A, published Oct. 23, 2001.
European Search Report dated Feb. 24, 2004 for EP 03015493.4.

* cited by examiner

*Primary Examiner*—Daniel Wu
*Assistant Examiner*—Eric M. Blount
(74) *Attorney, Agent, or Firm*—James A. Deland

(57) ABSTRACT

A bicycle display apparatus comprises a display device adapted to be mounted to the bicycle, wherein the display device displays various types of information to a rider; a light sensor; and a display control element operatively coupled to the display device and to the light sensor for controlling the display device in accordance with signals from the light sensor. An apparatus provided for shifting a bicycle transmission having a plurality of gear positions comprises a running condition detector that detects a running condition of the bicycle; a light sensor; and a gearshift control element operatively coupled to the running condition detector and to the light sensor and providing a control signal for controlling the bicycle transmission in accordance with signals from the light sensor.

28 Claims, 13 Drawing Sheets

FIG. 7

| A1 MODE | 1ST SPEED | 2ND SPEED | 3RD SPEED |
|---|---|---|---|
| UPWARD THRESHOLD VALUE (km/h) | 16.7 | 22.6 | |
| DOWNWARD THRESHOLD VALUE (km/h) | | 15.2 | 20.7 |

| A2 MODE | 1ST SPEED | 2ND SPEED | 3RD SPEED |
|---|---|---|---|
| UPWARD THRESHOLD VALUE (km/h) | 12.7 | 17.1 | |
| DOWNWARD THRESHOLD VALUE (km/h) | | 11.5 | 15.6 |

| A3 MODE | 1ST SPEED | 2ND SPEED | 3RD SPEED |
|---|---|---|---|
| UPWARD THRESHOLD VALUE (km/h) | 9.6 | 12.9 | |
| DOWNWARD THRESHOLD VALUE (km/h) | | 8.7 | 11.8 |

# ILLUMINATION-CONTROLLED BICYCLE DEVICES

BACKGROUND OF THE INVENTION

The present invention is directed to bicycles and, more particularly, to bicycle devices that may be controlled at least in part by lighting conditions.

Bicycle computers often have an LCD display, for example, for displaying various types of information to the rider. Such information may include time, the bicycle speed, running distances, cadence (crank RPM), the gearshift position, and other information related to running conditions. Bicycle-mounted gearshift systems, and automatic gearshift systems in particular, comprise running condition detecting means for detecting the running condition of the bicycle, a gearshift apparatus, and gearshift control means for upshifting and downshifting the gearshift apparatus in accordance with the running condition of the bicycle.

Because the surrounding brightness differs between daytime and nighttime, there are cases when it is convenient to have the display and running conditions differ when riding the bicycle at these times. For example, at night it is more difficult to view the display and operate the bicycle even with a front headlight switched on. The desired information displayed in the morning and in the evening also may differ. However, there are only a few known systems that change the display and running conditions in conjunction with such surrounding conditions, and these systems are limited to changing the ON/OFF state of the front headlight in accordance with the illumination. As a result, advantageous display and running conditions cannot be provided in conjunction with the surrounding conditions.

SUMMARY OF THE INVENTION

The present invention is directed to bicycle devices that may be controlled at least in part by lighting conditions. In one embodiment, a bicycle display apparatus comprises a display device adapted to be mounted to the bicycle, wherein the display device displays various types of information to a rider; a light sensor; and a display control element operatively coupled to the display device and to the light sensor for controlling the display device in accordance with signals from the light sensor. In another embodiment, an apparatus provided for shifting a bicycle transmission having a plurality of gear positions comprises a running condition detector that detects a running condition of the bicycle; a light sensor; and a gearshift control element operatively coupled to the running condition detector and to the light sensor and providing a control signal for controlling the bicycle transmission in accordance with signals from the light sensor.

Additional inventive features will become apparent from the description below, and such features alone or in combination with the above features may form the basis of further inventions as recited in the claims and their equivalents.

BRIEF DESCRIPTION OF THE DRAWINGS

FIG. 7 is a series of tables showing the shifting characteristics for various automatic shifting modes;

DETAILED DESCRIPTION OF THE EMBODIMENTS

Figure 1:
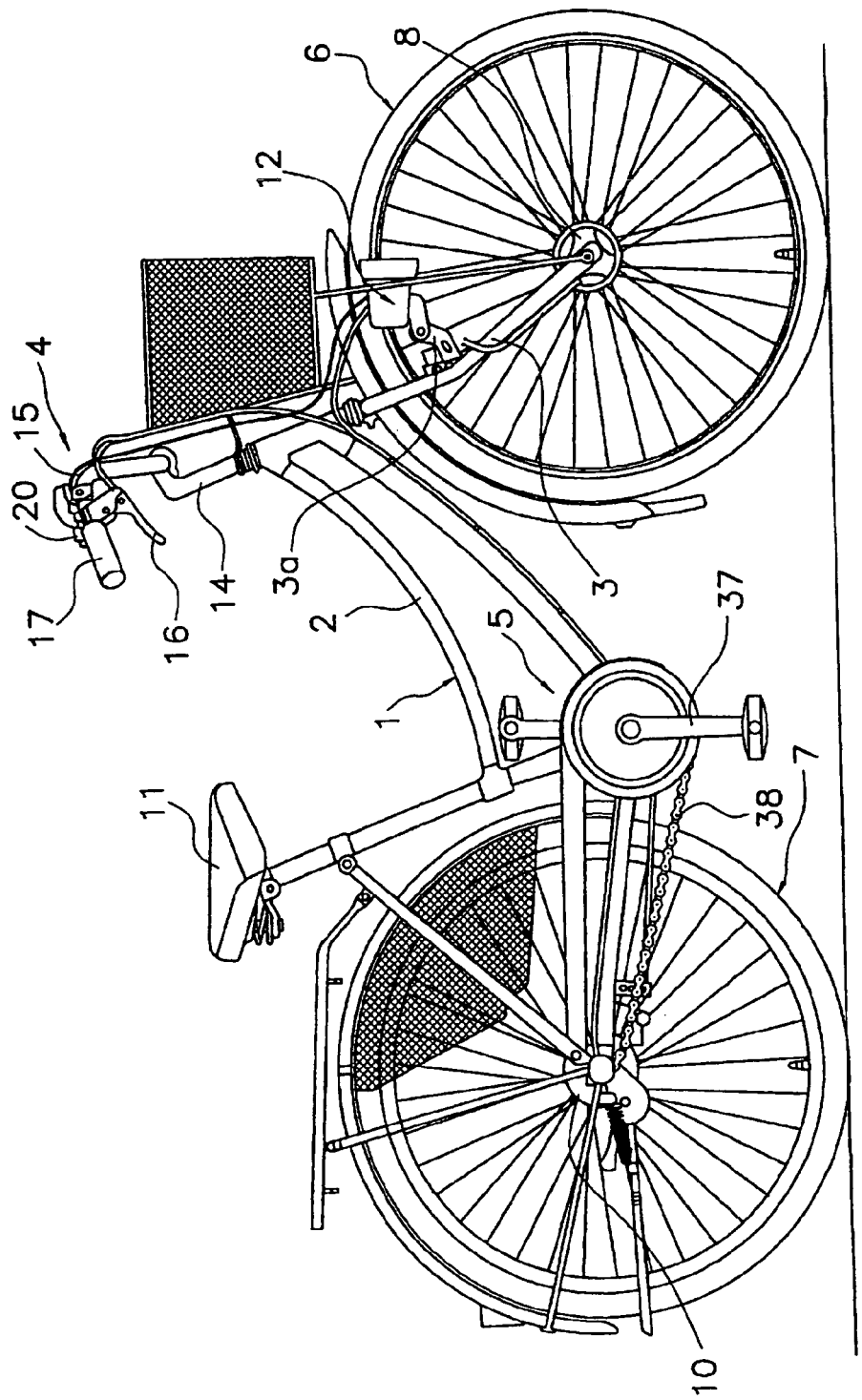
FIG. 1 is a side view of a bicycle that includes particular embodiments of illumination-controlled devices.

FIG. 1 is a side view of a bicycle that includes particular embodiments of illumination-controlled devices. This bicycle is a light roadster recreational bicycle comprising a frame 1 having a double-loop frame body 2 formed from welded tubes, a front fork 3 rotatably mounted to the frame body 2, a handle component 4, a drive component 5, a front wheel 6 on which a dynamo hub 8 with brakes is mounted, a rear wheel 7 on which an internal shifting hub 10 is mounted, a saddle 11, a shift control unit 12 to control shifting of the internal shifting hub 10, and a shift controller 20 for manually operating the shift control unit 12.

Figure 2:
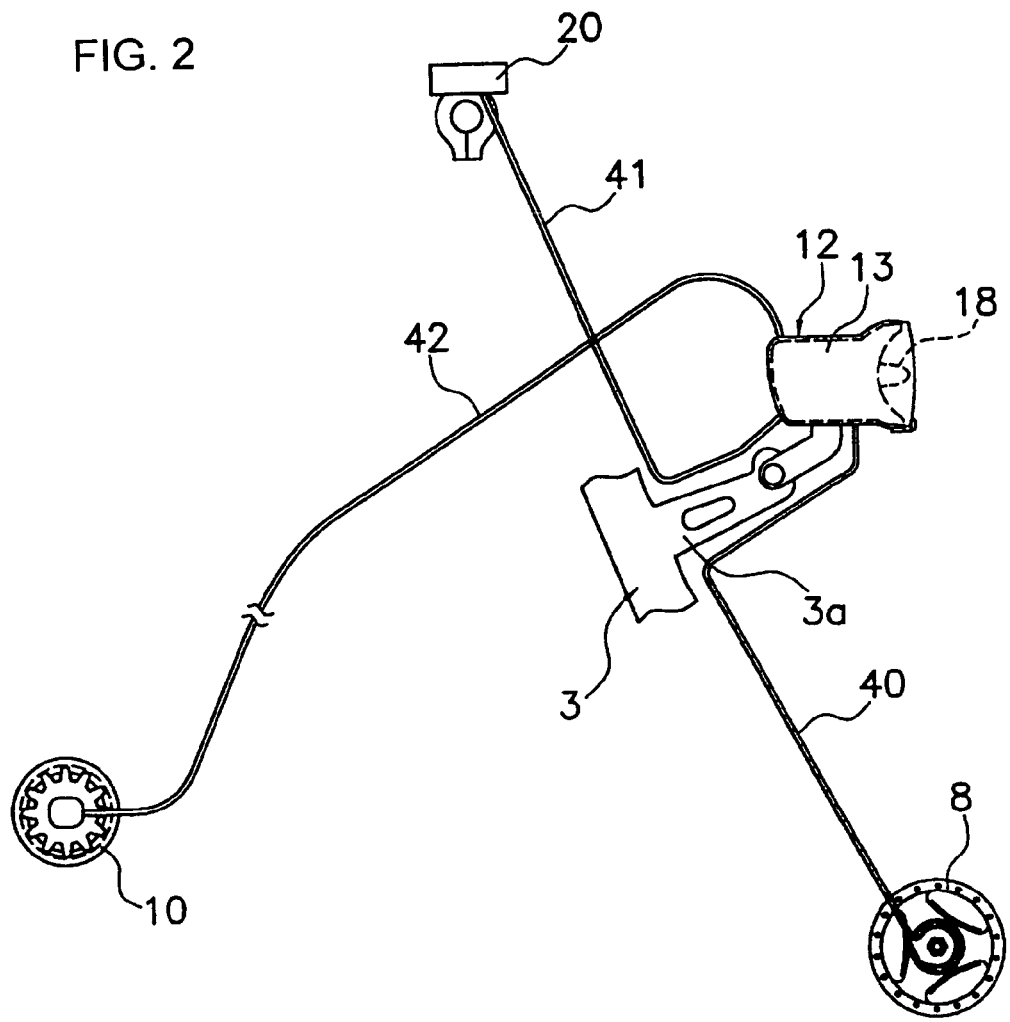
FIG. 2 illustrates how a shift controller, a shift control unit, a dynamo and a transmission are coupled together.

The handle component 4 comprises a handle stem 14, fastened to the upper part of the front fork 3, and a handlebar 15 fastened to the handle stem 14. Brake levers 16 and grips 17 are mounted on both ends of the handlebar 15. In this embodiment, the shift controller 20 is integrated with the right-side brake lever 16. The drive component 5 comprises a crank 37, mounted on the lower part (bottom bracket component) of the frame body 2, and a chain 38 that engages the crank 37 and the internal shifting hub 10. The internal shifting hub 10 is capable of producing three speed steps, including a low speed step (speed 1), an intermediate speed step (speed 2), and a high speed step (speed 3). These three speed steps can be selected by means of a motor unit 29 (FIG. 3) in the shift control unit 12. The dynamo hub 8 of the front wheel 6 can be fitted with a roller-type front brake, and it houses an alternating current dynamo 19 (FIG. 6) that generates electricity in response to the rotation of the front wheel 6. As shown in FIG. 2, the shift control unit 12 is electrically connected to the alternating current dynamo 19 housed in the dynamo hub 8 by electrical wiring 40, and it is electrically connected to the shift controller 20 by electrical wiring 41. Placing the dynamo 19 within hub 8 reduces pedaling resistance because the dynamo is mounted near the hub axle. The shift control unit 12 is mechanically connected to the internal shifting hub 10 by a shift control cable 42.

Figure 3:
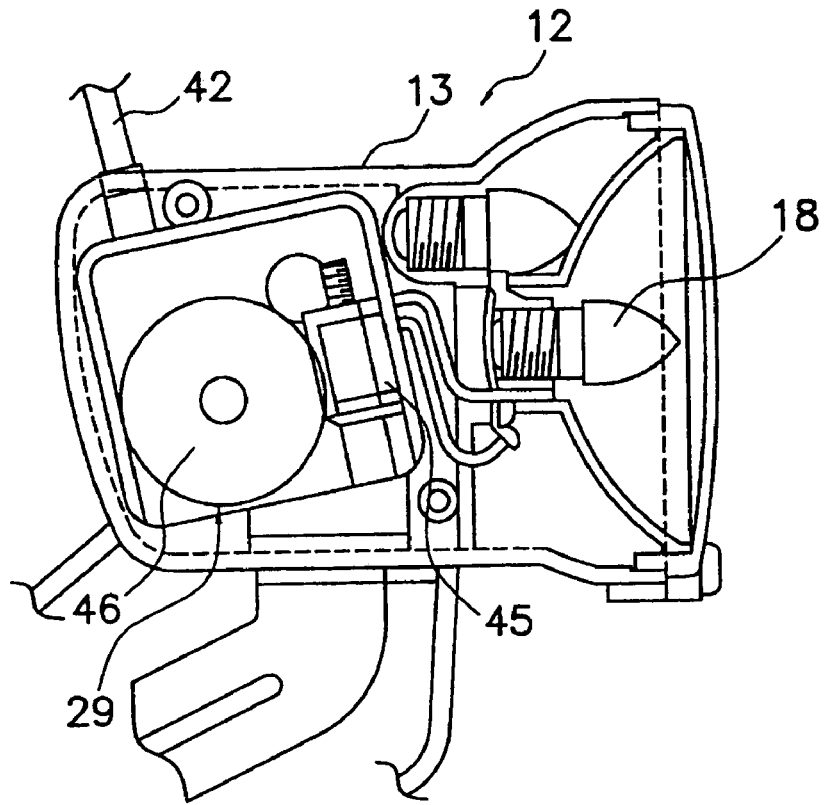
FIG. 3 is a side cross sectional view of the shift control unit shown in FIG. 2.
Figure 4:
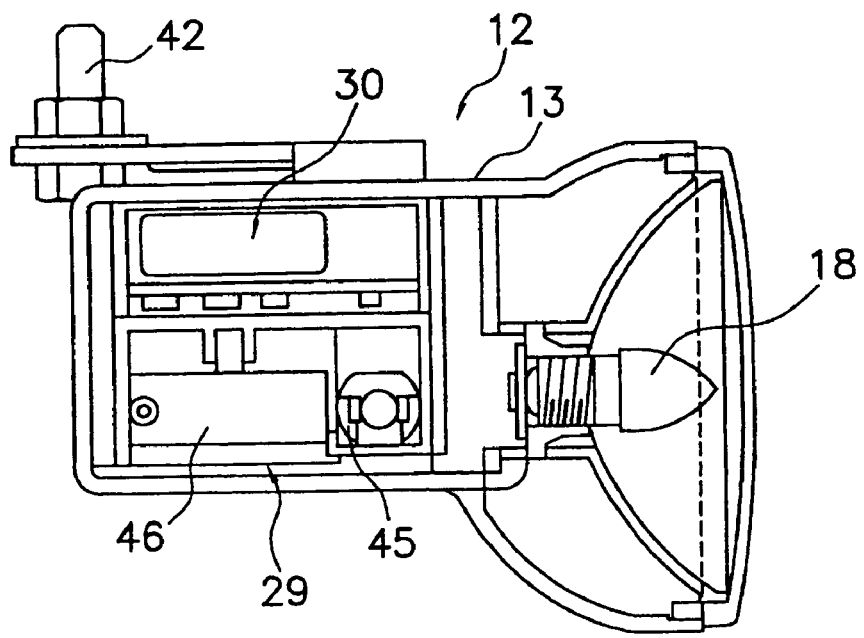
FIG. 4 is a top cross sectional view of the shift control unit shown in FIG. 2.

As shown in FIGS. 3 and 4, the shift control unit 12 comprises a headlight case 13 mounted to a headlight stay 3a located midway along the front fork 3 for housing a headlight 18. The motor unit 29 and a circuit unit 30 are housed in the headlight case 13. The motor unit 29 comprises an electric shifting motor 45, a cable operating component 46 which moves into three shifting positions by means of the shifting motor 45, and a position sensor 47 (FIG. 6) to detect the shift position of the cable operating component 46. One end of the shift control cable 42 is connected to this cable operating component 46. This arrangement facilitates waterproof construction, since no electrical wires are needed between the shift control unit 12 and the internal shifting hub 10 or headlight 18. Furthermore, all of these components are mounted to the front of the bicycle, where they do not interfere with riding. The circuit unit 30 comprises a control element 25 (FIG. 6) containing a microcomputer comprising a CPU, RAM, ROM, and an I/O interface.

Figure 5:
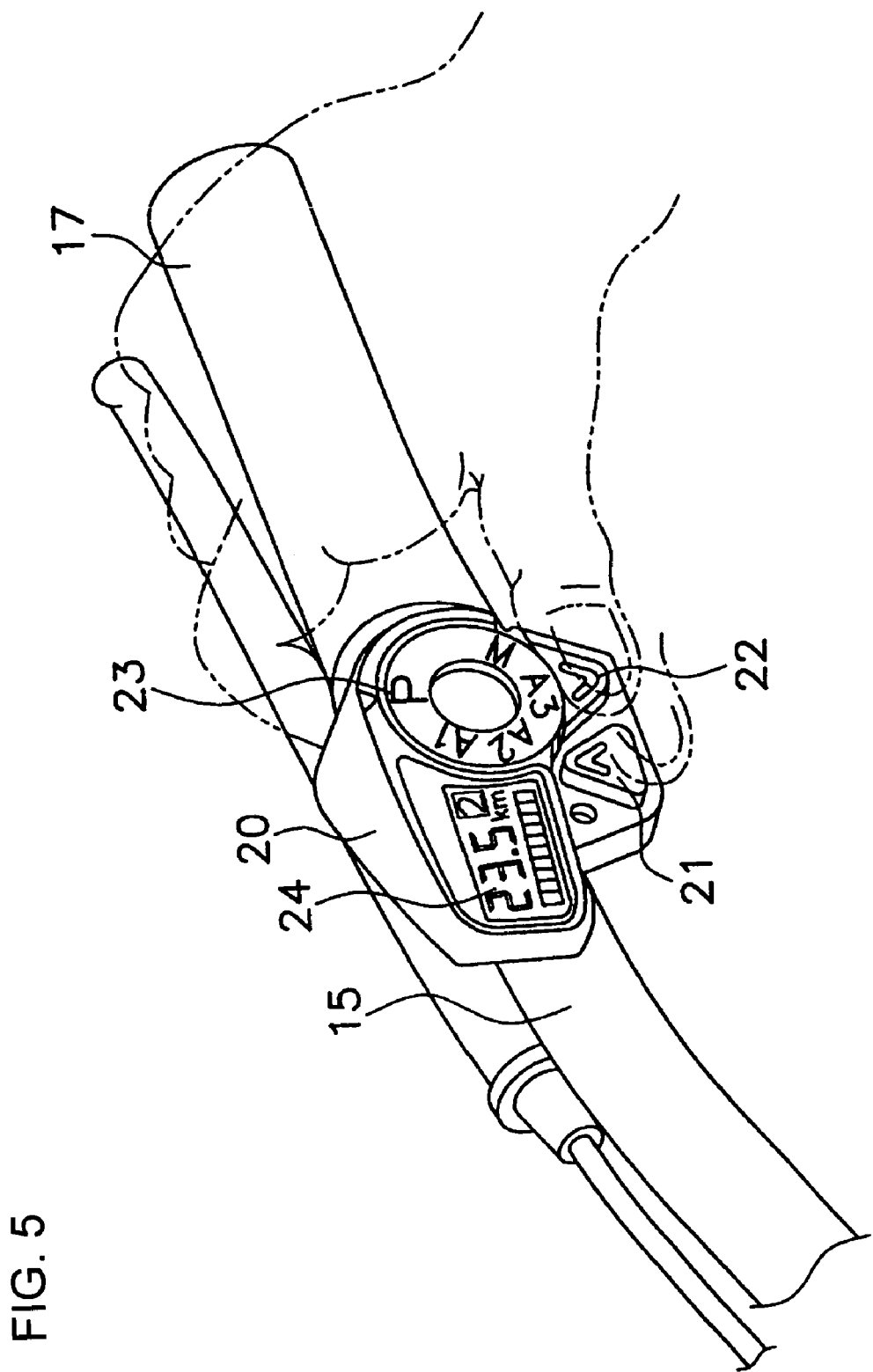
FIG. 5 is a perspective view of the shift controller.

As shown in FIG. 5, the shift controller 20 comprises two operating buttons 21 and 22 in the form of triangular pushbuttons disposed next to each other, an operating dial 23 disposed above the operating buttons 21 and 22, and a liquid crystal display device 24 disposed to the left of the operating dial 23. The operating button 21 on the left side is for manually shifting from the low speed step to the intermediate speed step and to the high speed step. The operating button 22 on the right side is for manually shifting from the high speed step to the intermediate speed step and to the low speed step. The operating dial 23 is used for switching between a manual shifting mode (M), three automatic shifting modes (A1–A3), and a parking mode (P) using five detent positions. The three automatic shifting modes (A1–A3) are modes for automatically shifting the internal shifting hub 10 according to a bicycle speed signal derived from the alternating current dynamo 19 in a manner described below. The manual shifting mode (M) is a mode for manually shifting the internal shifting hub (10) using the operating buttons 21 and 22, and the parking mode (P) is a mode for locking the internal shifting hub (10).

The three automatic shifting modes (A1–A3) are designed to allow shift timing (i.e., the threshold speed values at which shifting will occur) to be automatically changed during upshifting (shifting from low speed to high speed) or downshifting (shifting from high speed to low speed). The speed threshold values for the various modes are shown in FIG. 7. The upward and downward shift timings gradually decrease from automatic shifting mode (A1) through automatic shifting mode (A3) such that automatic shifting mode (A1) shifts at the highest speed, and automatic shifting mode (A3) shifts at the lowest speed. Furthermore, the spacing of the threshold values decreases from automatic shifting mode (A1) to automatic shifting mode (A3). It is usually preferable to set the shift controller to automatic shifting mode (A2). When automatic shifting mode (A2) is selected, for example, the internal shifting hub 10 is upshifted from speed 1 to speed 2 when the bicycle speed reaches 12.7 km/h. Similarly, the internal shifting hub 10 is upshifted to speed 3 when the bicycle speed reaches 17.1 km/h. On the other hand, when the bicycle speed later falls to 15.6 km/h, the internal shifting hub 10 is downshifted to speed 2, and again downshifted to speed 1 when the bicycle speed falls to 11.5 km/h. Between upshift timing and downshift timing, downshift timing is set as the lower of the two to prevent chattering during shifting. For climbing hills, a mode may be set according to the steepness of the hill.

Figure 6:
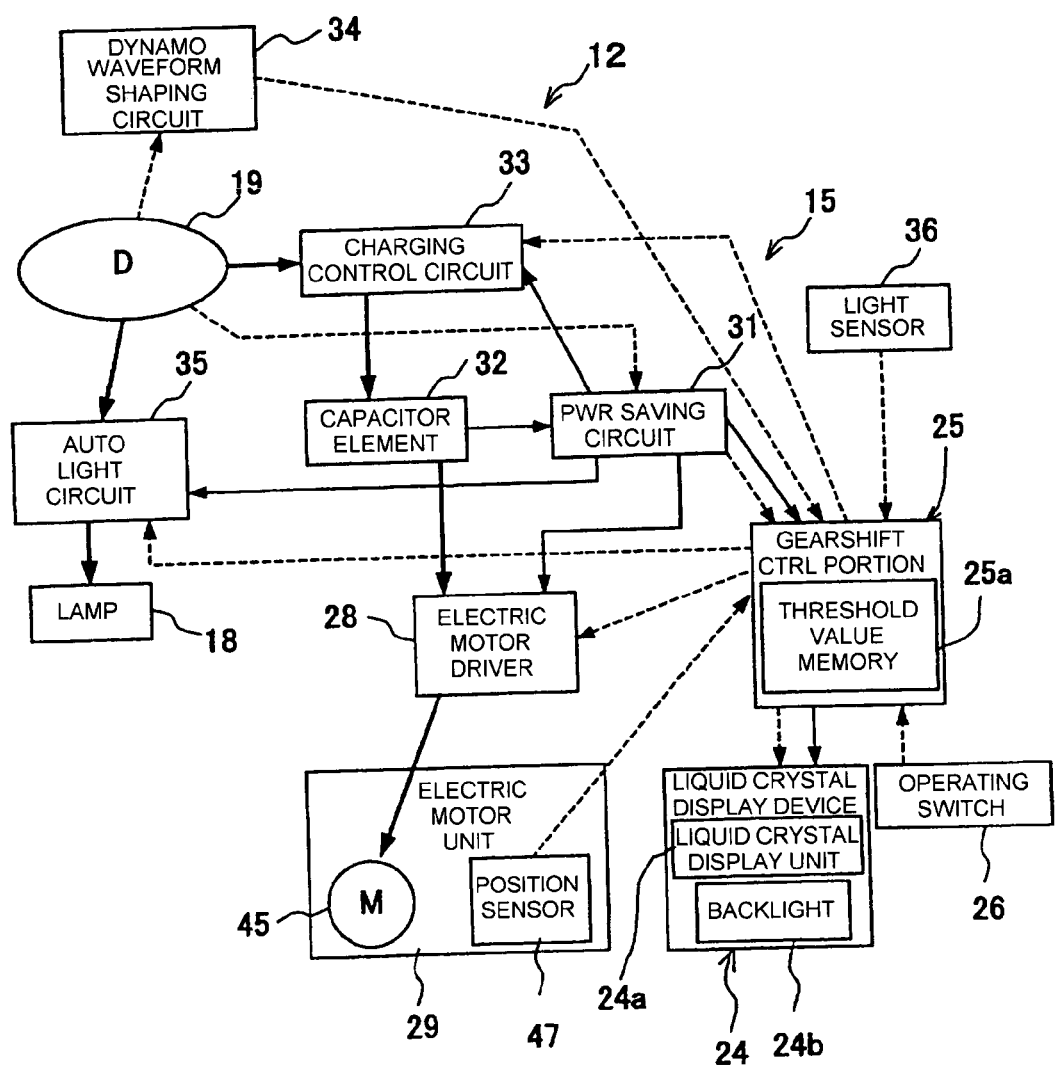
FIG. 6 is a schematic block diagram of the overall bicycle control system.
Figure 8:
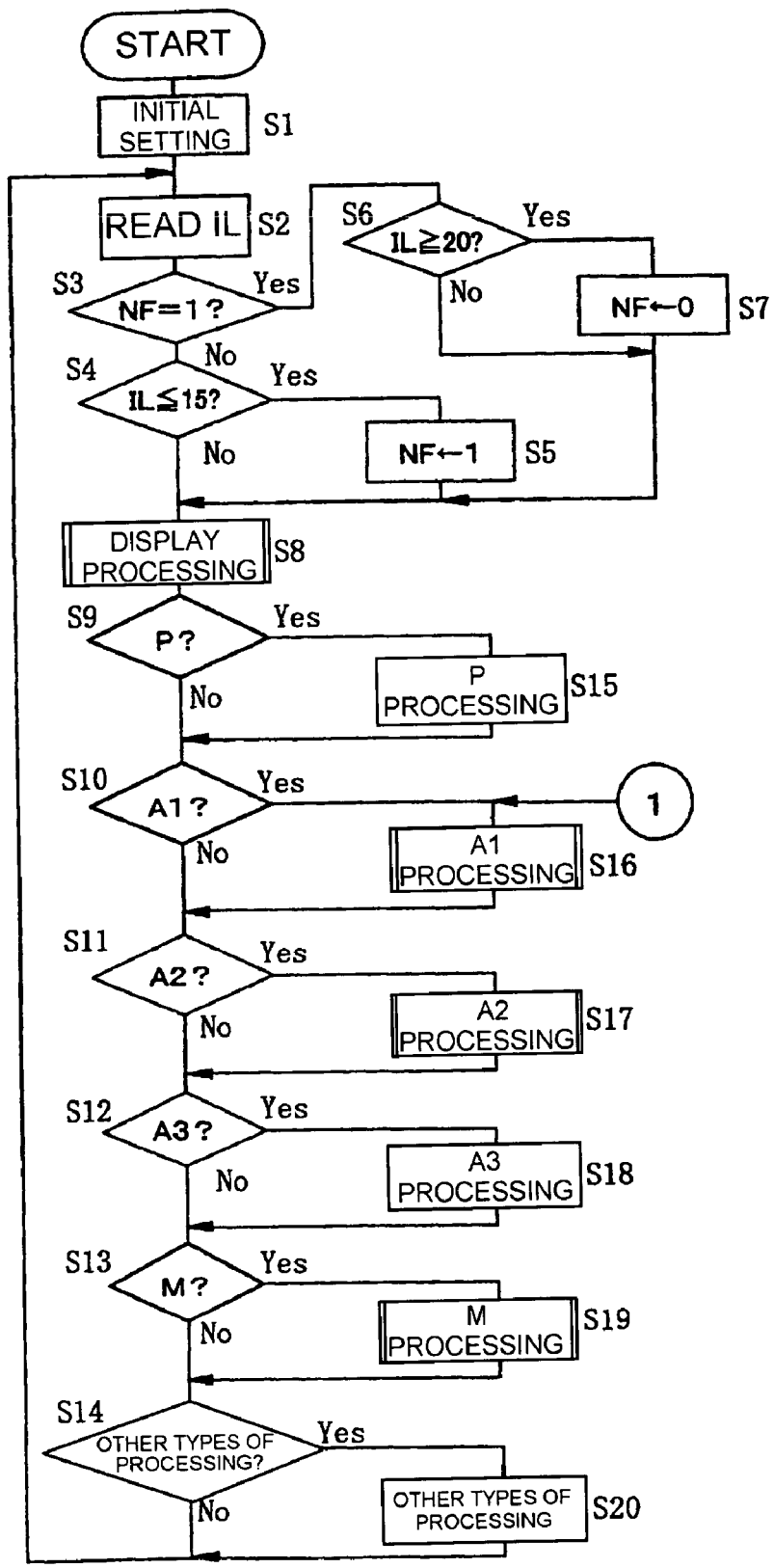
FIG. 8 is a flowchart of a particular embodiment of a main routine for the bicycle control system.

FIG. 6 is a block diagram illustrating the structure of the overall bicycle control system. Heavy lines in FIG. 6 indicate lines carrying about 1 A of current, solid lines indicate lines carrying about 5 mA of current, and dotted lines indicate signal lines. Control element 25 is operatively coupled to an operating switch 26 (which schematically represents the operating dial 23 and operating buttons 21 and 22 in the shift controller 20); to the liquid crystal display device 24; to a light sensor 36 (illumination sensor) for controlling the headlight 18, the internal shifting hub 10, and the liquid crystal display device 24; to a dynamo waveform shaping circuit 34 that generates a speed signal derived from the output of the alternating current dynamo 19, to a motor driver 28, to the position sensor 47 of the motor unit 29, and to other input/output components. Control element 25 includes a threshold value memory 25a that stores the threshold values shown in FIG. 7.

Control element 25 automatically controls shifting of the internal shifting hub 10 via motor driver 28 according to travel speed, and it controls the information displayed on the liquid crystal display device 24 disposed in the shift controller 20. The control element 25 also controls the headlight 18 by turning it on when surrounding light conditions fall below a certain prescribed brightness, and by turning it off when surrounding light conditions are above the prescribed brightness.

In this embodiment, control element 25 also controls shifting of the internal shifting hub 10 based on the surrounding lighting conditions. For example, when the surrounding illumination is equal to or less than a predetermined brightness (e.g., 15 lux), the gearshift mode is set to the automatic shifting mode (A1) (i.e., the mode which shifts gears at the highest speed), regardless of the selected gearshift mode. When the surrounding illumination is equal to or greater than a predetermined brightness (e.g., 20 lux), the gearshift mode is returned to the originally set mode. This approach reduces the frequency of gear shifting and reduces power consumption at nighttime when power consumption from headlight 18 already is high. It also makes it more difficult to run at high speed, so the speed can be held in check.

The liquid crystal display device 24 has a liquid crystal display unit 24a and a backlight 24b facing the liquid crystal display unit 24a. Liquid crystal display unit 24a displays the current speed, the gearshift step and other information. The backlight 24b uses an LED that is capable of illumination with seven colors, for example. In this embodiment, the backlight 24b is switched on when the surrounding illumination is equal to or less than a predetermined brightness (e.g., 15 lux) and is switched off when the surrounding illumination equal to or greater than a predetermined brightness (e.g., 20 lux).

A charging control circuit 33, a power storage element 32 (e.g., a capacitor), and an auto light circuit 35 are operatively coupled to the control element 25 via a power-saving circuit 31. A signal from the alternating current dynamo 19 is input to the power-saving circuit 31, and it is determined based on this signal whether or not the bicycle is stopped. The power saving circuit 31 supplies the control element 25, the motor driver 28, the charging control circuit 33 and the auto light circuit 35 with electrical power stored by the power storage element 32 when the bicycle is moving for the normal operation of these components, and it interrupts the supply of electrical power to these components when the bicycle is stopped to avoid needless expenditure of electrical power stored by the power storage element 32. Motor driver 28 operates on a 1 mA current supplied by the power-saving circuit 31, and it controls a 1 A current supplied by the power storage element 32 to operate the shifting motor 45.

The charging control circuit 33 comprises, for example, a half-wave rectifier circuit that rectifies an alternating current output from the alternating current dynamo 19 to 1 A and 5 mA direct currents (for example). The power storage element may 32 comprise, for example, a high-capacity capacitor that stores the direct current power that is output from the charging control circuit 33. The power storage element 32 also may comprise secondary batteries such as nickel cadmium batteries, lithium ion batteries, nickel-metal hydride batteries, etc., in lieu of a capacitor.

The dynamo waveform shaping circuit 34 forms a speed signal from the alternating current output from the alternating current dynamo 19. More specifically, a half-cycle is extracted from a sine wave alternating current signal, passed through a Schmitt circuit or other appropriate waveform shaping circuit, and formed into a pulse signal corresponding to speed. Control element 25 uses this signal to control the automatic shifting of the internal shifting hub 10 without requiring a separate speed sensor.

The auto light circuit 35 supplies or interrupts the 1 A current output from the alternating current dynamo 19 to the headlight 18 in response to on/off signal output from the control element 25. Control element 25 generates these signal based on the signals from the light sensor 36 in such a manner that the headlight 18 is switched on automatically when light levels fall below a prescribed limit, and it is switched off when light levels exceed the prescribed limit. In this embodiment, headlight 18 is operated from the alternating current dynamo 19 so that the current draw is less apt to adversely affect the power storage element 32, but this is not necessary.

Battery replacement and recharging are unnecessary because the power storage element 32 stores electrical power from the alternating current dynamo 19, and components such as the control element 25 are operated using this electrical power. Monitoring remaining battery power and carrying along spare batteries also become unnecessary, and shifting can be done automatically without performing the cumbersome procedures required by conventional power sources. The electrical power from the alternating current dynamo 19, which conventionally is not employed in the daytime, can be put to effective use in the shift control unit 12.

Bicycle speed is detected based on the alternating current signal output from the alternating current dynamo 19, and shifting is controlled according to the detected bicycle speed. Because alternating current dynamos generally have a plurality of circumferentially disposed magnetic poles, the alternating current dynamo outputs an alternating current signal with a frequency related to the bicycle speed and the number of magnetic poles. Consequently, it is possible to obtain a larger number of signal pulses from the alternating current signal during each wheel rotation in comparison with a speed signal obtainable, for example, from a conventional speed sensor that detects a magnet mounted to the bicycle wheel. Therefore, the bicycle speed can be accurately detected within the space of one wheel rotation, and shifting can be controlled in real time with high precision. Furthermore, since shifting is controlled based on the alternating current signal from the alternating current dynamo 19, it is no longer necessary to dispose the shift control unit 12 in the vicinity of the bicycle wheel. No limitation is placed on the mounting position of the shift control unit 12.

The operation of control element 25 may be understood from the flowcharts shown in FIGS. 8–12. When the power supply is switched on, the settings are initialized in step S1 of FIG. 8. For example, the wheel circumference for calculating the bicycle speed may be set to a diameter of 26 inches, and all process flags are reset.

A night flag NF is provided for discriminating between day and night. In this embodiment, the night flag NF is set to ON when the surrounding illumination IL is 15 lux or less, and it is set to OFF when the surrounding illumination is 20 lux or greater. More specifically, the illumination IL is read from the light sensor 36 in step S2. In step S3, a determination is made whether or not the night flag NF is already set to ON (=1). If the night flag NF is not set to ON, the process moves to step S4 and a determination is made whether or not the illumination IL is 15 lux or less. If the illumination is 15 lux or less, then the process moves to step S5, and the night flag NF is set to ON. If the illumination is greater than 15 lux, then this processing is skipped and the process moves to step S8.

If it is determined in step S3 that the night flag NF is already set to ON, then the process moves from step S3 to step S6. In step S6, a determination is made whether or not the illumination IL is 20 lux or greater. If the illumination IL is 20 lux or greater, then the process moves to step S7 and the night flag NF is set to OFF. If the illumination IL is less than 20, then step S7 is skipped and the process moves to step S8.

Figure 9:
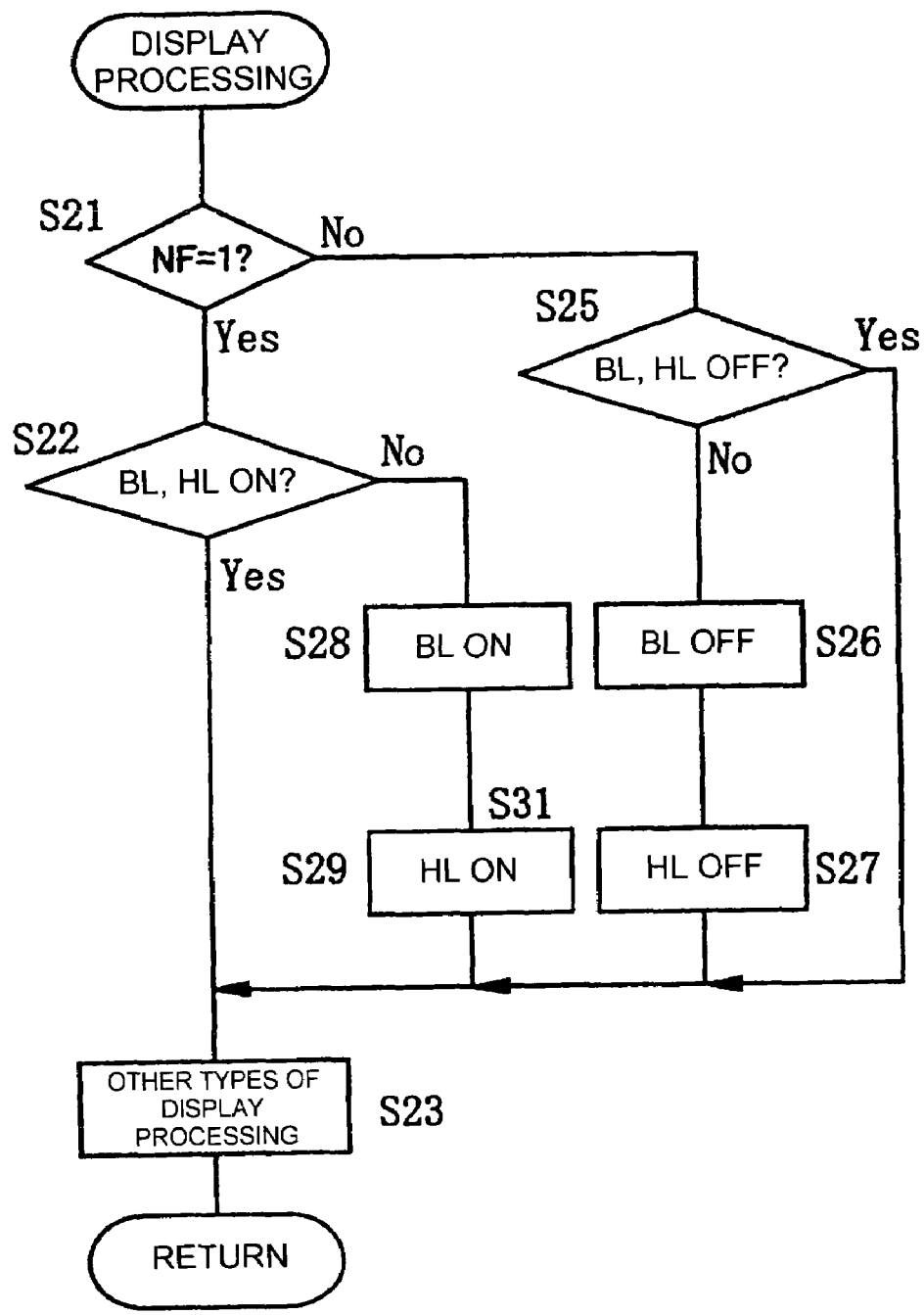
FIG. 9 is a flowchart of a particular embodiment of a display control process.

In step S8, a display processing routine shown in FIG. 9 is performed. In step S9, a determination is made whether or not the operating dial 23 has been set to the parking mode (P). If so, then the process moves from step S9 to step S15 to perform a parking processing routine. If not, then a determination is made in step S10 whether or not the operating dial 23 has been set to the automatic shifting mode (A1). If so, then the process moves from step S10 to step S16 to perform automatic shifting mode (A1) processing shown in FIG. 10. If not, then a determination is made in step S11 whether or not the operating dial 23 has been set to the automatic shifting mode (A2). If so, then the process moves from step S11 to step S17 to perform automatic shifting mode (A2) processing shown in FIG. 11. If not, then a determination is made in step S12 whether or not the operating dial 23 has been set to the automatic shifting mode (A3). If so, then the process moves from step S12 to step S18 to perform automatic shifting mode (A3) processing in the same manner shown for automatic shifting mode (A2) processing. If not, then a determination is made in step S13 whether or not the operating dial 23 has been set to the manual mode (M). If so, then the process moves from step S13 to step S19 to perform manual mode (M) processing shown in FIG. 12. If not, then a determination is made in step S14 whether or not tire diameter input or some other processing has been selected. If so, then such other processing is performed in step S20.

In the display process of step S8, shown in FIG. 9, a determination is made whether or not the night flag NF is set to ON (=1) in step S21. When the night flag NF is set to ON (i.e., it is nighttime), a determination is made in step S22 whether or not the backlight 24b and the headlight 18 are lighted. If so, then the process moves to step S23, various types of display processing are performed, and the process returns to the main routine. If not, then the process moves to steps S28 and S29, the backlight 24b and the headlight 18 are lighted, and the process moves to step S23. If it is determined in step S21 that the night flag NF is set to OFF (i.e., it is daytime), the process moves from step S21 to step S25, and a determination is made whether or not the backlight 24b and the headlight 18 are turned off. If so, then the process moves to step S23. If not, then the process moves to steps S26 and S27, the backlight 24b and the headlight 18 are turned off, and the process moves to step S23. Because the ON/OFF state of the backlight 24b and the headlight 18 is set in accordance with the surrounding illumination, for example, it is easy to visually confirm various types of information in conjunction with the surrounding conditions, and various types of information can be displayed under advantageous display conditions on the liquid crystal display 24a.

In the parking processing of step S15, the internal shifting hub 10 is set in a locked state, and code registration processing for registering a code that releases the locked state of the internal shifting hub 10, code input processing for releasing the locked state, code verification processing for performing a verification, and other types of processing are executed in accordance with the operation of the operating buttons 21 and 22.

Figure 10:
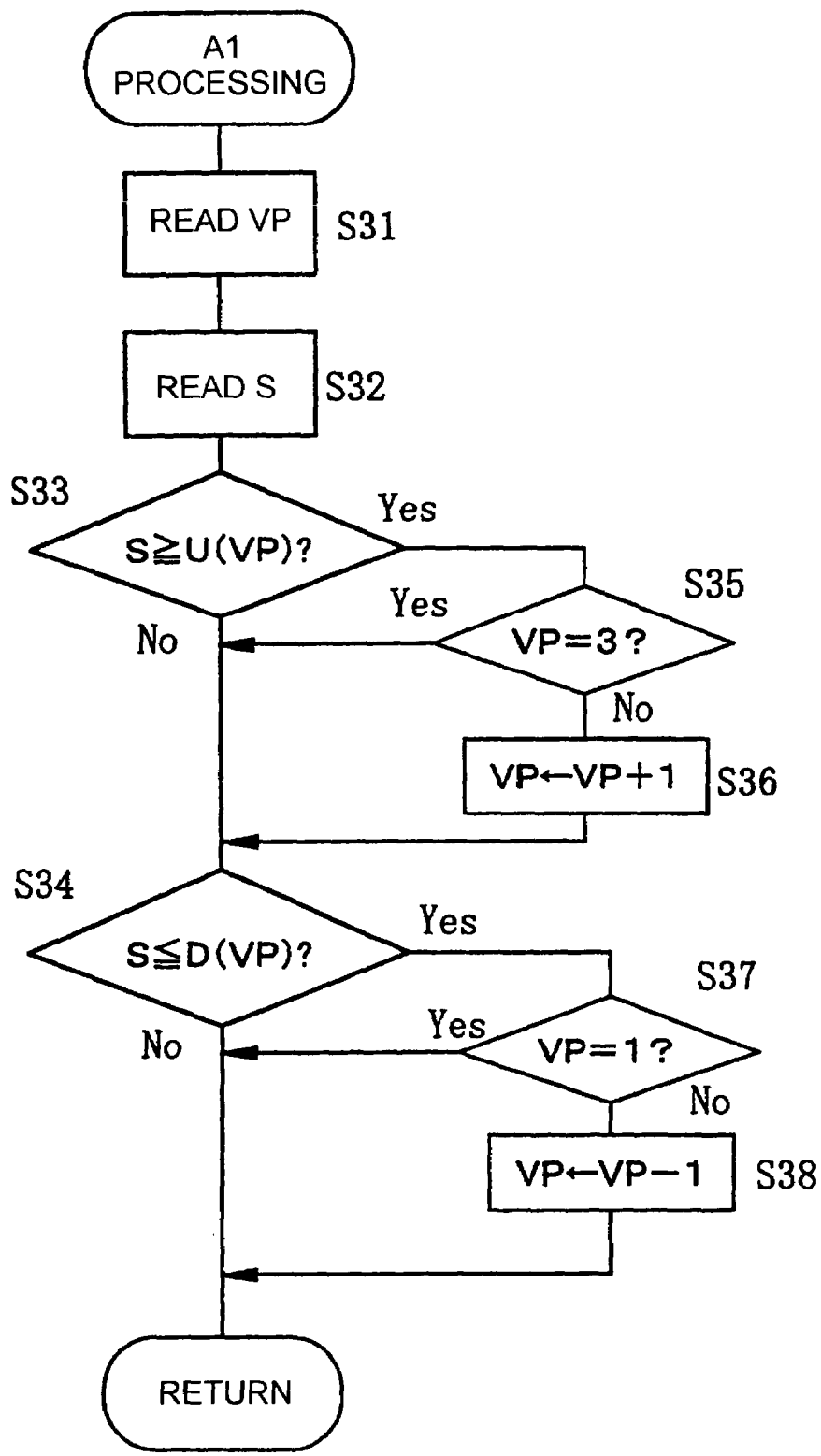
FIG. 10 is a flowchart of a particular embodiment of an automatic gear shifting process.

In the automatic shifting mode (A1) processing shown in FIG. 10, a gear position value VP is set to the gear position that corresponds to the bicycle speed S. When the actual gear position does not agree with this value, then the internal shifting hub 10 is shifted in the appropriate direction one step at a time. More specifically, the gear position value VP is read from the position sensor 47 in step S31, and the current bicycle speed S is determined from the speed signal from the alternating current dynamo 19 in a step S32. In step S33, a determination is made whether or not the bicycle speed S exceeds the upshift threshold value U (VP) (FIG. 7) that corresponds to the gear position value VP. In step S34, a determination is made whether or not the bicycle speed S is less than the downshift threshold value D (VP) that corresponds to the gear position value VP.

If the current bicycle speed S exceeds the upshift threshold value U (VP) that corresponds to the current gear position shown in FIG. 7, then the process moves from step S33 to step S35. For example, when the gear position corresponds to second gear (VP=2), the process moves from step S33 to step S35 when the bicycle speed S is greater than 22.6 km/h. In step S35, a determination is made whether or not the gear position corresponds to third gear. If so, then the process moves to step S34 without any processing because shifting higher than this is not possible. If the gear position is less than third gear, then the process moves to step S36, the gear position value VP is increased by one in order to upshift the internal shifting hub by one step, and the process moves to step S34.

If the current bicycle speed S is below the downshift threshold value D (VP) that corresponds to the current gear position shown in FIG. 7, then the process moves from step S34 to step S37. For example, when the gear position corresponds to second gear (VP=2), the process moves from step S34 to step S37 when the bicycle speed S is less than 15.2 km/h. In step S37, a determination is made whether or not the gear position is first gear. If the gear position is first gear, then the process returns to the main routine without any further processing. If the gear position is equal to or greater than second gear, then the process moves to step S38, the gear position value VP is lowered by one in order to downshift the internal shifting hub 10 by one step, and the process returns to the main routine.

Figure 11:
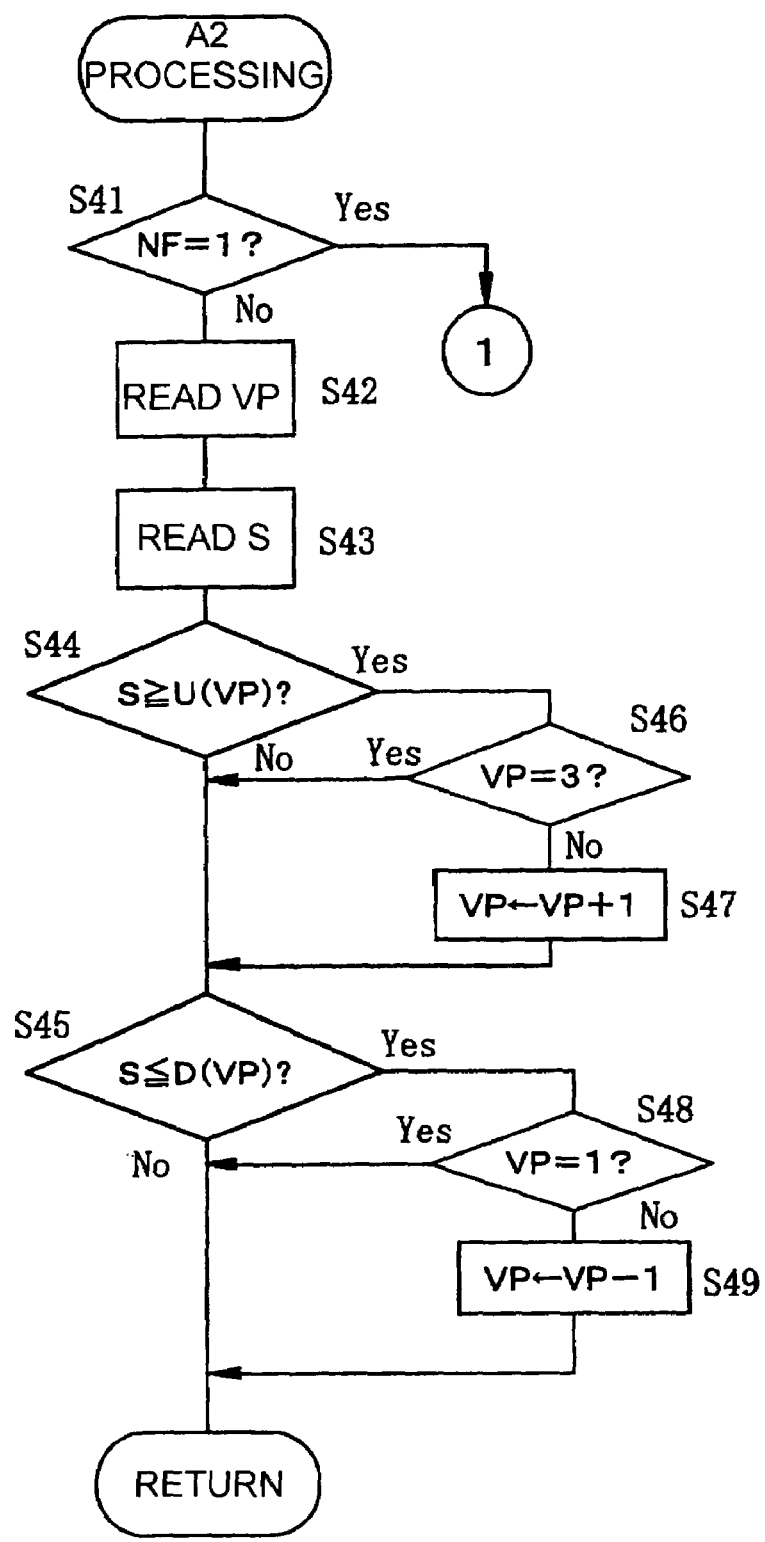
FIG. 11 is a flowchart of another embodiment of an automatic gear shifting process.

In the automatic shifting mode (A2) processing shown in FIG. 11 as well, the gear position value VP is set to the gear position that corresponds to the bicycle speed S. When the actual gear position does not agree with this value, then the internal shifting hub 10 is shifted in the appropriate direction one step at a time. More specifically, a determination is made in step S41 whether or not the night flag NF is set to ON. If so, then the process moves to step S16 in FIG. 8, and automatic shifting mode (A1) processing is executed. In other words, automatic shifting mode (A1) processing is executed regardless of the shifting mode selected on operating dial 23 when automatic gear shifting is desired at nighttime. This approach allows the frequency of gear shifting to be reduced and the power consumption to be held in check at nighttime, when power consumption already is heavy with the headlight 18 turned on.

If the night flag NF is not set to ON, the process moves to step S42. The processing in steps S42 to S49 is the same as that for the steps S33 to S38 of the automatic shifting mode (A1) processing shown in FIG. 10, so a description has been omitted. The processing of the automatic shifting mode (A3) of step S18 is the same as the processing of the automatic shifting mode (A2) processing, with only the shift threshold values differing, so this also has been omitted.

Figure 12:
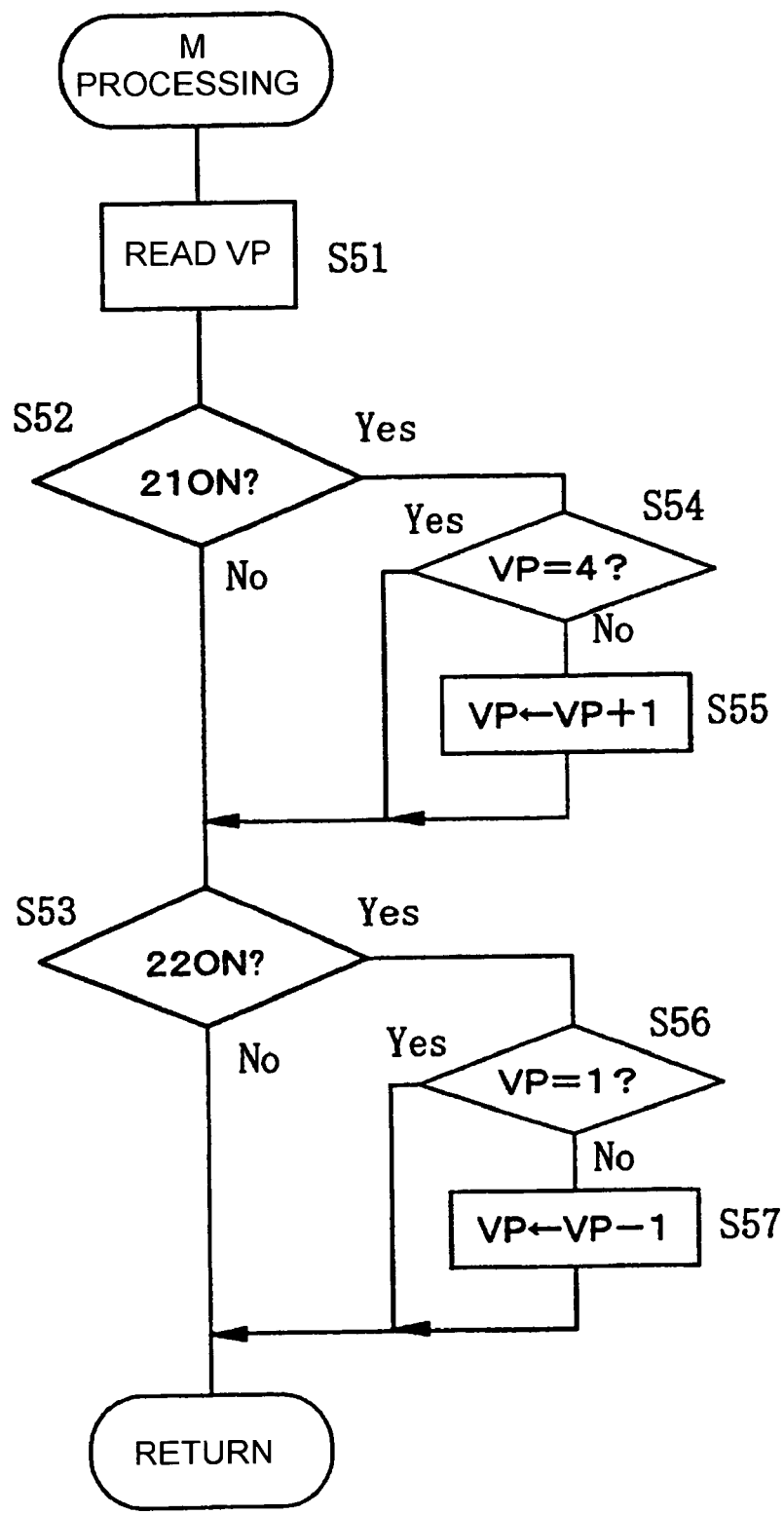
FIG. 12 is a flowchart of a particular embodiment of a manual gear shifting process.

In the manual mode (M) processing shown in FIG. 12, the internal shifting hub 10 is shifted one step at a time by the operation of the operating buttons 21 and 22. More specifically, the gear position value VP is read from position sensor 47 in step S51. In step S52, a determination is made whether or not the operating button 21 has been operated, and in step S53, a determination is made whether or not the operating button 22 has been operated. If the operating button 21 has been operated, then the process moves from step S52 to S54, and a determination is made from the current gear position value VP whether or not the internal shifting hub 10 is in third gear. If the internal shifting hub 10 is not in third gear, then the process moves to step S55 wherein the gear position value VP is incremented by one gear position and the internal shifting hub 10 is upshifted accordingly. If the internal shifting hub 10 currently is in third gear, then this processing is skipped.

If the operating button 22 has been operated, then the process moves from step S53 to S56, and a determination is made from the current gear position value VP whether or not the internal shifting hub 10 is in first gear. If the internal shifting hub 10 is not in first gear, then the process moves to step S57, the gear position value VP is decreased by one gear position and the internal shifting hub 10 is downshifted accordingly. If the internal shifting hub 10 currently is in first gear, then this processing is skipped.

Thus, the ON/OFF state of the backlight 24b is controlled in the present embodiment in accordance with daytime and nighttime, and the gearshift action during automatic gear shifting is changed accordingly. As a result, various types of information can be displayed advantageously in conjunction with the surrounding conditions, and gear shifting can be conducted under advantageous running conditions.

While the above is a description of various embodiments of the present invention, further modifications may be employed without departing from the spirit and scope of the present invention. For example, an internal shifting hub was controllably shifted in the aforementioned embodiment, but the shifting device need not be mounted internally. The shifting device could comprise a derailleur, such as a front and/or rear derailleur. If desired, two motor units may be used for controlling each derailleur.

The display device described above was controlled by the same control element that controlled the gearshifting operation, but a control element dedicated for display operation may also be separately provided. The bicycle speed was detected with a signal from the dynamo hub, but the bicycle speed also may be detected with a signal from a dynamo that is brought into contact with the rim or the tire, or from a separate speed sensor.

In the above-described embodiment, the internal shifting hub 10 is immediately upshifted when the upshift threshold value U (VP) is exceeded, but the gearshift action may be performed only if it is determined that the upshift threshold value U (VP) has been exceeded again after waiting a predetermined time T1 or T2 after the threshold value U (VP) was exceeded the first time. In such an embodiment, gear shifting is delayed in case the threshold value U (VP)

is exceeded only transiently, so gearshift action occurring contrary to the intention of the rider is reduced.

Figure 13:
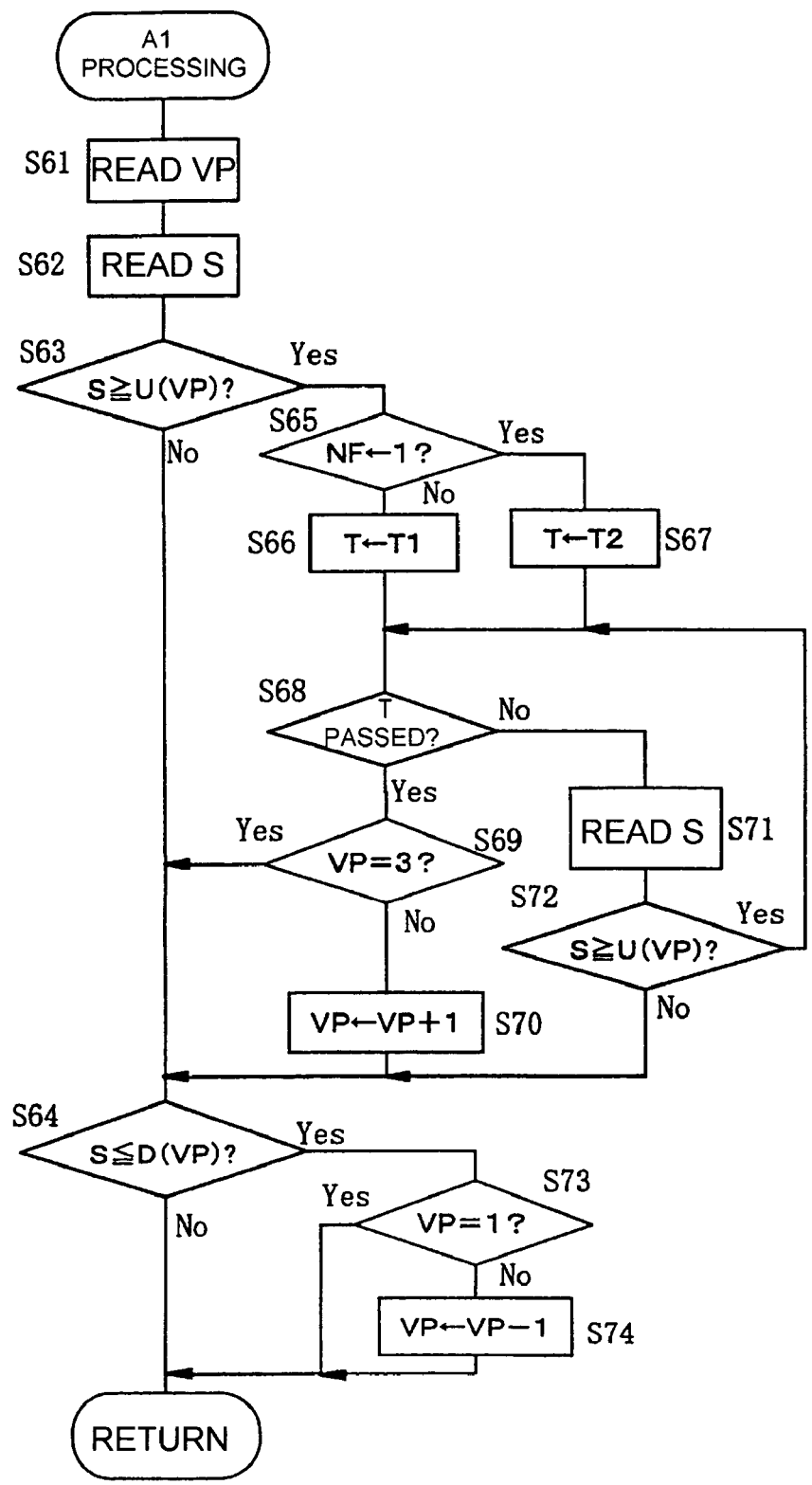
FIG. 13 is a flowchart of another embodiment of an automatic gear shifting process.

An example of automatic shifting mode (A1) processing for this case is shown in FIG. 13. As in the previous routines, the gear position value VP is read from position sensor 47 in step S61, and the current bicycle speed S is derived from the speed signal from the alternating current dynamo 19 in a step S62. In step S63, a determination is made whether or not the bicycle speed S exceeds the upshift threshold value U (VP) from FIG. 7 that corresponds to the gear position value VP, and in step S64 a determination is made whether or not the bicycle speed S is less than the downshift threshold value D (VP) that corresponds to the gear position value VP.

If the current bicycle speed S exceeds the upshift threshold value U (VP), the process moves from step S63 to step S65, and a determination is made whether or not the night flag NF is set to ON (=1). If the night flag NF is not set to ON, then the process moves to step S66, and a wait time T is set to a predetermined time T1. If the night flag NF is set to ON, then the process moves to step S67, and the wait time T is set to a predetermined time T2 that is longer than the predetermined time T1. The process then moves to step S68.

In step S68, a determination is made whether or not the wait time T has passed or not. If the predetermined time T has not passed, then the process moves to step S71, and the bicycle speed S is obtained again. In step 72, a determination is made whether or not the newly obtained bicycle speed S exceeds the upshift threshold value U (VP) of the current gear position. If not, the process moves to step S64 without any processing. If the bicycle speed S exceeds the upshift threshold value U (VP), then the process returns to step S68 where a determination is again made whether or not the wait time T has passed.

When it is determined that the wait time T has passed, then the process moves from step S68 to step S69, and a determination is made whether or not the internal shifting hub 10 is in third gear. When the internal shifting hub is in third gear, it is not possible to shift higher, so the process moves to step S64 without any action. When the internal shifting hub 10 is in less than third gear, then the process moves to step S70, the gear position value VP is incremented by one in order to upshift the internal shifting hub 10 by one gear, and the process moves to step S64.

By changing the value of the wait time T that sets the gearshift timing separately for daytime and nighttime, and by setting the predetermined time T2 for nighttime longer than the predetermined time T1 for daytime, it is possible to reduce the frequency of gear shifting and to hold power consumption in check in this case as well.

Figure 14:
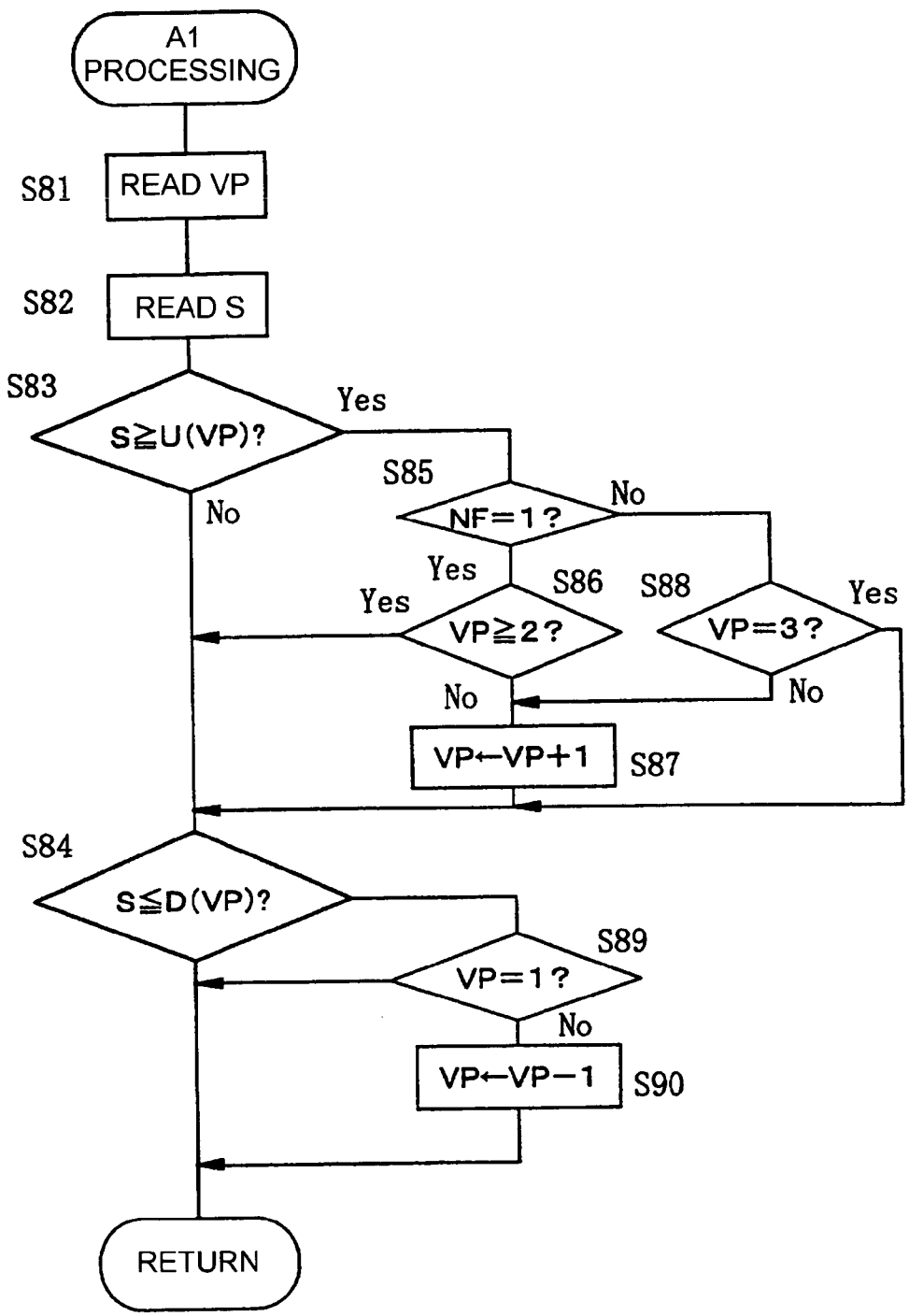
FIG. 14 is a flowchart of another embodiment of an automatic gear shifting process.

In the case of automatic gear shifting, the system may be configured such that the internal shifting hub 10 is not shifted to a specified gear at nighttime. For example, the system may be configured such that the internal shifting hub can only be shifted to first speed or second speed without the use of third speed. FIG. 14 illustrates processing in such an embodiment. In this case, a determination is made in step S85 whether or not the night flag NF is set to ON. If the night flag NF is set to ON, then the process moves to step S86, and a determination is made whether or not the internal shifting hub 10 is in second gear or higher. If so, then the process moves to step S84 without any processing. Other processing is the same as the automatic shifting mode (A1) processing shown in FIG. 10, so a full description has been omitted.

The system also may be configured such that only the manual mode (M) can be executed at nighttime even if an automatic shifting mode is selected. In this case, if the night flag NF is set to ON in step S41 of FIG. 11 in any of the automatic shifting modes (A1–A3), then the process may be configured to jump to the manual mode processing of step S19 of FIG. 8.

In the above-described embodiment, the ON/OFF state of the backlight 24b is controlled based on daytime and nighttime, but the system may be configured so that at least one of the hue, the color saturation, and the luminance of the backlight 24b is changed depending upon whether it is daytime and nighttime. The system also may be configured so that the display content is switched based on whether it is daytime and nighttime. For example, the time may be displayed during the daytime when the rider is traveling to work, and the speed may be displayed at nighttime when it is more difficult to determine speed visually.

In the above-described embodiment, the motor 45 is disposed within the shift control unit 12, but the motor 45, the position sensor 47, and other components may be disposed at the internal shifting hub 10. In this case, the shift control unit 12 and the internal shifting hub 10 may be connected with an electrical wire rather than a gearshift cable.

In the above-described embodiment, the bicycle speed is detected as the running condition, but the crank RPM may be detected as the running condition to facilitate pedaling within a desired cadence range. In this case, the crank RPM may be directly detected, or the crank RPM may be detected by reverse computation from the bicycle speed and the gear position or ratio.

When the system is configured such that a sound alert is generated when the internal shifting hub 10 is shifted, the sound alert may be set to OFF or the volume may be reduced to provide quieter operation at nighttime. Alternatively, a different tone may be used depending upon whether it is daytime or nighttime.

In the above-described embodiment, the light sensor 36 is mounted on the bicycle, but it may be worn by the rider, and the illumination data may be transmitted to the gearshift control portion by wireless communication or other communication means, for example.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A bicycle display apparatus comprising:
    a display device adapted to be mounted to the bicycle, wherein the display device displays various types of information to a rider;
    a light sensor; and
    a display control element operatively coupled to the display device and to the light sensor for controlling the display device in accordance with signals from the light sensor;

wherein the display control element controls the type of information displayed to the rider in accordance with the signals from the light sensor.

2. The apparatus according to claim 1 wherein the display device comprises:
   a liquid crystal display unit for displaying the various types of information; and
   a backlight for illuminating the liquid display unit.

3. The apparatus according to claim 2 wherein the display control element selectively changes at least one of a hue, a luminance or a color saturation of the backlight in accordance with the signals from the light sensor.

4. The apparatus according to claim 2 wherein the display control element controls the backlight in accordance with the signals from the light sensor.

5. The apparatus according to claim 4 wherein the display control element selectively turns the backlight on and off in accordance with the signals from the light sensor.

6. The apparatus according to claim 1 further comprising a light adapted to be mounted to the bicycle, wherein the display control element controls the light in accordance with the signals from the light sensor.

7. The apparatus according to claim 6 wherein the light comprises a headlight.

8. The apparatus according to claim 1 further comprising an alternating current generator for supplying electric power to at least one of the display device and the display control element.

9. The apparatus according to claim 8 wherein the alternating current generator is mounted on a hub axle of a bicycle wheel.

10. An apparatus used for shifting a bicycle transmission having a plurality of gear positions, wherein the apparatus comprises:
    a running condition detector that detects a running condition of the bicycle;
    a light sensor; and
    a gearshift control element operatively coupled to the running condition detector and to the light sensor and providing a control signal for controlling the bicycle transmission in accordance with signals from the light sensor.

11. The apparatus according to claim 10 wherein the running condition detector detects bicycle speed.

12. The apparatus according to claim 10 wherein the running condition detector detects crank RPM.

13. The apparatus according to claim 10 further comprising a light adapted to be mounted to the bicycle, wherein the gearshift control element controls the light in accordance with the signals from the light sensor.

14. The apparatus according to claim 13 wherein the light comprises a headlight.

15. The apparatus according to claim 10 further comprising an alternating current generator for supplying electric power to the gearshift control element.

16. The apparatus according to claim 15 wherein the alternating current generator is mounted on a hub axle of a bicycle wheel.

17. The apparatus according to claim 15 wherein the running condition detector detects the running condition from an alternating current signal from the alternating current generator.

18. The apparatus according to claim 10 wherein the gearshift control element changes shift timing of the bicycle transmission in accordance with the signals from the light sensor.

19. The apparatus according to claim 18 wherein the gearshift control element changes gearshift timing in at least one of an upshift direction and a downshift direction in accordance with the signals from the light sensor.

20. The apparatus according to claim 10 wherein the gearshift control element includes a shift threshold memory that stores a shift threshold value, and wherein the gearshift control element provides the control signal when the running condition detected by the running condition detector passes the shift threshold value.

21. The apparatus according to claim 20 wherein the threshold memory stores an upshift threshold value and a downshift threshold value for at least one of the gear positions, wherein the gearshift control element provides an upshift control signal when the running condition detected by the running condition detector passes the upshift threshold value, and wherein the gearshift control element provides a downshift control signal when the running condition detected by the running condition detector passes the downshift threshold value.

22. The apparatus according to claim 21 wherein the gearshift control element provides an upshift control signal when the running condition detected by the running condition detector exceeds the upshift threshold value, and wherein the gearshift control element provides a downshift control signal when the running condition detected by the running condition detector falls below the downshift threshold value.

23. The apparatus according to claim 19 wherein the shift threshold memory stores a plurality of shift tables, each shift table storing a plurality of the shift threshold values, and wherein the gearshift control element selects among the plurality of shift tables in accordance with the signals from the light sensor.

24. The apparatus according to claim 10 wherein the gearshift control element adjusts timing of the providing of the control signal in accordance with the signals from the light sensor.

25. The apparatus according to claim 10 wherein the gearshift control element selectively prohibits shifting to at least one gear position in accordance with the signals from the light sensor.

26. The apparatus according to claim 10 wherein the gearshift control element includes a manual mode of operation and an automatic mode of operation, and wherein the gearshift control element switches between the manual mode of operation and the automatic mode of operation in accordance with the signals from the light sensor.

27. The apparatus according to claim 10 wherein the gearshift control element provides a sound when a gearshift operation is to occur, and wherein the gearshift control element controls an attribute of the sound in accordance with the signals from the light sensor.

28. The apparatus according to claim 27 wherein the gearshift control element controls at least one of an on/off state, a volume or a tone of the sound in accordance with the signals from the light sensor.

* * * * *